UNITED STATES PATENT OFFICE.

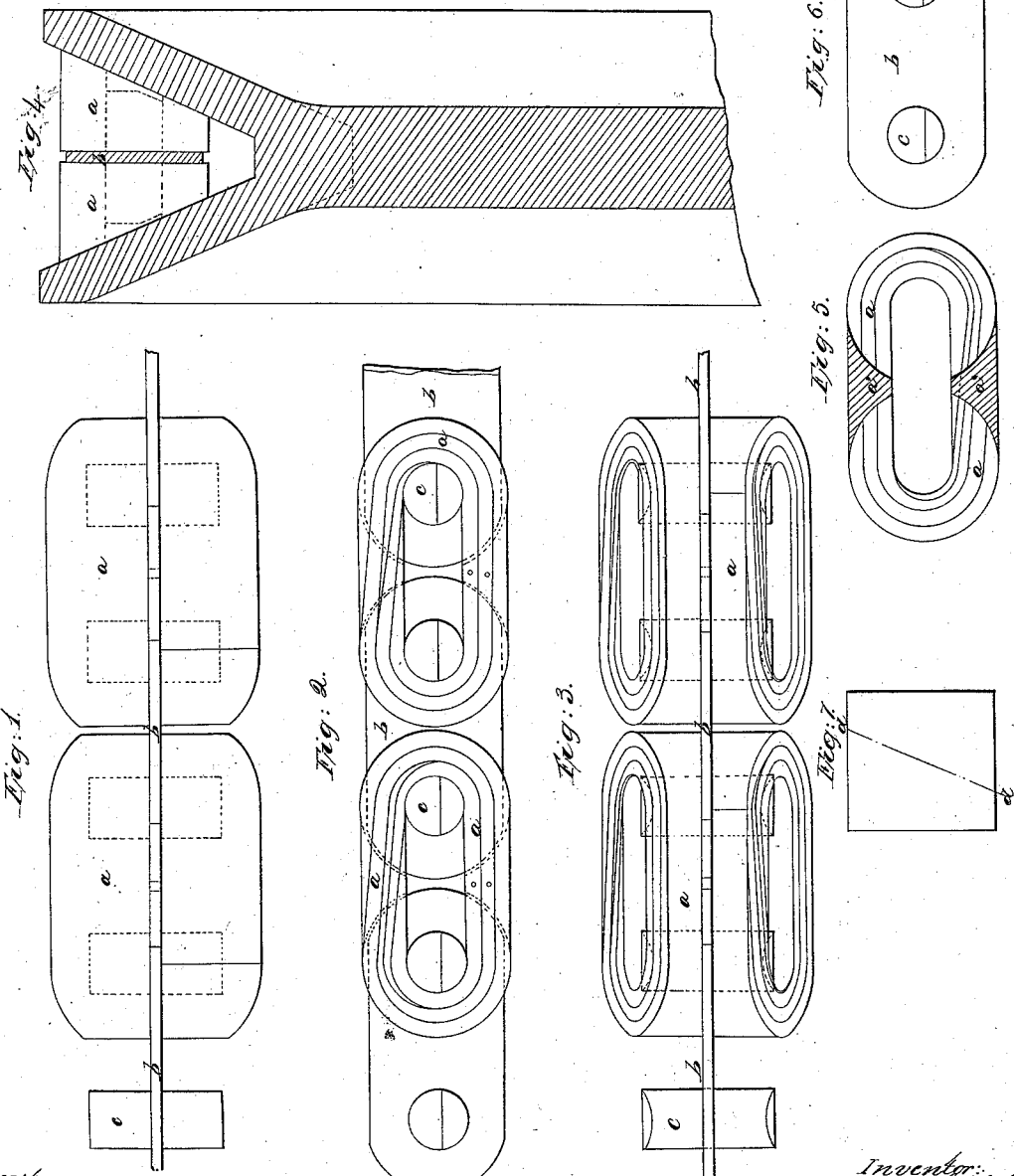

WILLIAM CLISSOLD, OF DUDBRIDGE, ENGLAND.

DRIVING-BELT.

Specification of Letters Patent No. 33,133, dated August 27, 1861.

*To all whom it may concern:*

Be it known that I, WILLIAM CLISSOLD, of Dudbridge, in the county of Gloucester, England, engineer, have invented an Improved Construction of Driving-Belt; and I do hereby declare that the following is a full and exact description of my said invention.

This invention relates to a novel mode of constructing that class of driving belts which bind by lateral pressure on their pulleys and thereby take so firm a hold as to remove the liability to slip which is a disadvantage common to ordinary driving belts. This improved class of belts which already forms the subject of Letters Patent may be described as an endless band beveled at its edges to fit into V grooves formed in the periphery of the driving pulleys such band being composed of layers of leather or other material connected together by pins or otherwise. In practice it has been found that the beneficial thickness of which these belts may be made is limited by reason of the unequal strain upon the outer and inner layers or parts of the material composing the belt and consequently that the strength of such belts cannot with advantage be indefinitely increased. From this cause it was deemed necessary to limit the application of belts constructed of a wedge or taper form in cross section to uses where no great strain was likely to be experienced.

Now the object of the present invention is so to increase the strength of belts of this class as to render them equal to the heaviest work to which it has hitherto been or may hereafter be found desirable to apply driving belts or bands. To this end I propose instead of making bevel edged belts as heretofore with one continuous length of beveled edge to form them of links which while presenting good contact surfaces to the V grooves of the pulleys (against which they will press laterally without touching the bottom of the grooves) will so divide the unequal strain upon the inner and outer surfaces of the belt hitherto found so destructive to the wedge form of belt as to render the strain nugatory. The friction or wedge shaped links may be made of strips of leather or other flexible material coiled up to the ordinary figure of a link or they may be made of molded rubber or other suitable plastic material. These links I propose to connect together by link plates carrying a stud at either end which studs will enter the space in two adjacent flexible links and hold them together forming in fact fulcrum pins for these links to turn on as they pass around the driving pulleys.

In the accompanying drawing I have shown my improved construction of link driving belt in several views the friction links being in this example composed of coils of leather.

Figure 1 represents the outer face and Fig. 2 a side elevation of a portion of the belt drawn to full size. Fig. 3 is a view of the inner face of the belt and Fig. 4 is a cross section showing the application of the belt to a V grooved pulley.

The wedge shaped links *a. a.* fit into the groove of the pulley but not so as to bed therein the object being to allow of the belt tightening on the pulley by sinking deeper into the groove as the breadth of the links decreases by wear. These links *a.* are each made by preference of two parts to facilitate the forming of sockets for the reception of the link plates *b. b.*; the parts *a. a.* are coupled together in the middle by filling pieces *a\** cemented thereto or otherwise attached to the ports *a.* I prefer to give to these filling pieces the form shown at Fig. 5 as they then serve to keep the link plates (one of which is shown detached at Fig. 6) in position when the belt is slack but other forms of filling pieces may be used.

*c. c.* are the studs of the link plates which may either be made of cast or wrought metal as thought most desirable.

When making the flexible links *a.* of leather I propose to form them with square sides as shown at Fig. 7, and then to divide them lengthwise by a diagonal cut as indicated by the red line *d. d.* By bringing together the square sides of the severed link the wedge shape will be obtained without waste of material. When the flexible links are made of plastic material they may be molded at once into the proper form for half links and then cemented together preparatory to being submitted to the curving operation.

From the above explanation it will be understood that this mode of making driving belts permits of any strength of link being used according to the work to which the belt is to be applied. I would also remark that belts constructed on this principle may be made wholly of metal in which case I prefer to line the V grooves of the pulleys with wood to prevent the grinding of metal against metal.

Having now described the nature of my invention I wish it to be understood that I claim—

Constructing wedge shaped driving belts suitable for working in conjunction with V grooved pulleys of links substantially in the manner and for the purpose above set forth.

In witness whereof I the said WILLIAM CLISSOLD have hereunto set my hand and seal this twenty-seventh day of May in the year of our Lord one thousand eight hundred and sixty-one.

WILLIAM CLISSOLD. [L. S.]

Witnesses:
A. H. JENKINS,
ALFRED SMITH.